US011816067B2

(12) United States Patent
BenHanokh et al.

(10) Patent No.: US 11,816,067 B2
(45) Date of Patent: Nov. 14, 2023

(54) PREFETCHING DATA FROM A DATA STORAGE SYSTEM

(71) Applicant: RED HAT, INC., Raleigh, NC (US)

(72) Inventors: Gabriel Zvi BenHanokh, Tel-Aviv (IL); Uri Lublin, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 63 days.

(21) Appl. No.: 16/953,847

(22) Filed: Nov. 20, 2020

(65) Prior Publication Data

US 2022/0164313 A1   May 26, 2022

(51) Int. Cl.
*G06F 15/16*    (2006.01)
*G06F 16/172*   (2019.01)
*G06F 16/18*    (2019.01)
*G06F 16/14*    (2019.01)

(52) U.S. Cl.
CPC .......... *G06F 16/172* (2019.01); *G06F 16/148* (2019.01); *G06F 16/156* (2019.01); *G06F 16/1873* (2019.01)

(58) Field of Classification Search
CPC .... G06F 16/172; G06F 16/148; G06F 16/156; G06F 16/1873
See application file for complete search history.

(56) References Cited

U.S. PATENT DOCUMENTS

| 9,846,711 B2 | 12/2017 | Borthakur et al. |
| 10,691,693 B2 | 6/2020 | Fanghaenel et al. |
| 2006/0004886 A1* | 1/2006 | Green .............. G06F 16/2329 707/999.203 |
| 2008/0065718 A1* | 3/2008 | Todd .................. H04L 67/28 709/219 |
| 2020/0183905 A1 | 6/2020 | Wang et al. |
| 2020/0250148 A1 | 8/2020 | Dayan et al. |

FOREIGN PATENT DOCUMENTS

| CN | 111581218 A | 8/2020 |
| WO | 2019144100 A1 | 7/2019 |

OTHER PUBLICATIONS

Ali et al. A Survey of Web Caching and Prefetching, IJASCA 3:1, 2011, pp. 1-27. (Year: 2011).*
Narayanan et al. DeepCache: A Deep Learning Based Framework For Content Caching. NetAI'18, pp. 48-53. (Year: 2018).*

(Continued)

*Primary Examiner* — Alex Gofman
*Assistant Examiner* — Shelly X Qian
(74) *Attorney, Agent, or Firm* — Kilpatrick Townsend & Stockton LLP

(57) ABSTRACT

Data can be prefetched from a data storage system. For example, a computing device can receive a write request from a software application. The write request can be for writing a first data object to a storage device. The computing device can determine a second data object that is to be prefetched based on a read request for the first data object from the software application. The computing device can generate metadata for the first data object. The metadata can indicate that the second data object is to be prefeteched. The computing device can store the first data object with the metadata in the storage device.

20 Claims, 4 Drawing Sheets

(56) References Cited

OTHER PUBLICATIONS

Yang et al. Leaper: A Learned Prefetcher for Cache Invalidation in LSM-tree based Storage Engines. VLDB 13:11, 2019, pp. 1976-1989. (Year: 2019).*
Sears et al. bLSM: A General Purpose Log Structured Merge Tree. SIGMOD'12, 2012, pp. 217-228. (Year: 2012).*
Yang, L., et al., "Leaper: A Learned Prefetcher for Cache Invalidation in LSM-Tree Based Storage Engines," ACM, Inc., 2020, https://dl.acm.org/doi/10.14778/3407790.3407803.

* cited by examiner

PREFETCHING DATA FROM A DATA STORAGE SYSTEM

TECHNICAL FIELD

The present disclosure relates generally to electronic data storage management. More specifically, but not by way of limitation, this disclosure relates to prefetching data objects from a data storage system such as a log-structured merge tree system.

BACKGROUND

One common type of data storage system is a log-structured merge (LSM) tree system. A LSM tree is a type of data structure for storing data objects as key-value pairs in an organized manner that uses a layer-based scheme. In general, a LSM tree can include a memory portion and a storage portion. The memory portion can include a cache memory that can be organized as a single layer. The storage portion can include a non-volatile storage device, such as a solid-state drive or a hard disk, that can be organized into a multi-layer structure.

In a LSM tree system, data objects are initially written to the memory portion and moved to the first layer of the storage portion when the memory portion is full. As the first layer becomes full, the LSM tree can move the key-value pairs to the next layer of the storage portion. The LSM tree can also merge layers to reduce the number of layers in the storage portion.

When a read request is received for a data object in the LSM tree, the memory portion of the LSM tree is first searched for the key associated with the data object. If the key is not in the memory portion, the storage portion of the LSM tree is then searched. The key may be present in multiple layers of the storage portion, so each layer of the storage portion is searched.

DETAILED DESCRIPTION

Figure 1:
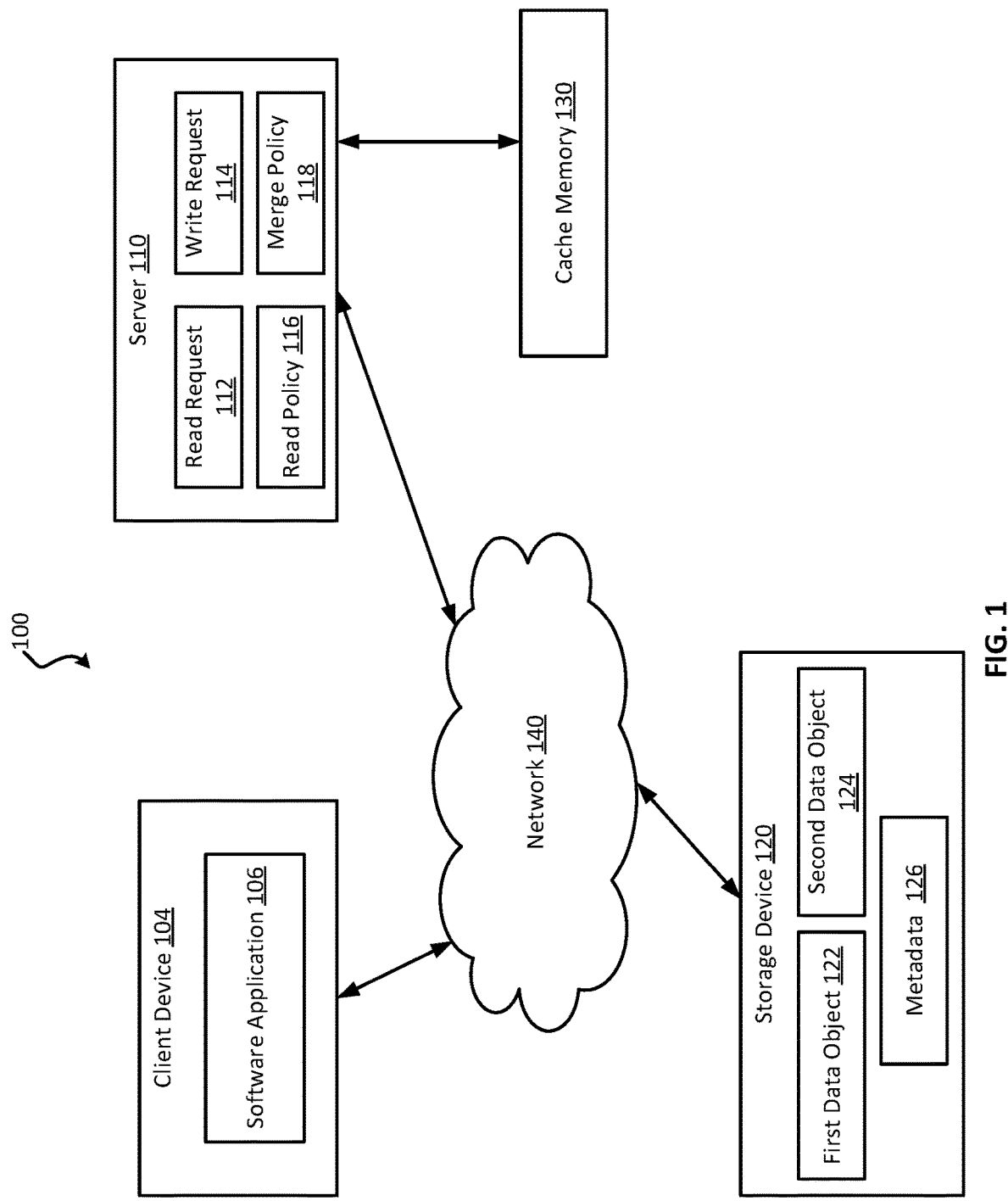
FIG. 1 is a block diagram of an example of a system for implementing data prefetching according to some aspects of the present disclosure.

Log-structured merge (LSM) tree systems can store data objects as key-value pairs in a cache memory. The cache memory has a predefined allotment of space for the key-value pairs, and once the allotment is reached, the key-value pairs can be moved to a storage device (e.g., a solid-state drive or a hard disk) to make space for additional writes. The LSM tree system is optimized for write operations because LSM trees can transform random write operations to sequential writes to the storage device. However, read operations can be slow for LSM tree systems. If a key is not present in the cache memory when a corresponding read request is received, each layer of the LSM tree in the storage device is searched for the key. This can take a significant amount of time and result in higher latency than if the key-value pair was already available in the cache memory. Other types of data storage systems may have similar problems.

Some examples of the present disclosure can overcome one or more of the abovementioned problems by prefetching data objects before read requests are received for the data objects. For example, the system can determine a relationship between a first data object and a second data object. The relationship may be that the second data object is frequently requested after the first data object. Based on the determined relationship, the system can generate metadata indicating that the second data object is to be prefetched when a read request for the first data object is received. The system can then store the metadata in conjunction with the first data object in a storage device of a data storage system, such as a LSM tree system. At a later point in time, the system can receive a read request for the first data object from a client device. In response to receiving the read request, the system can retrieve the first data object from the storage device and provide the first data object to the client device. The system can also retrieve the metadata corresponding to the first data object from the storage device, determine from the metadata that the second data object is to be prefeteched, and prefetch the second data object. The system can prefetch the second data object by retrieving it from the storage device and storing it in the cache memory. As a result, if the system subsequently receives a read request for the second data object (e.g., as is consistent with the historical pattern), the second data object is already present in the cache memory and can be rapidly provided to the client device. This may significantly reduce latency in the system.

As a more specific example, a computing device can receive a write request for writing data object A to a hard disk. The computing device can determine data object B has historically been requested after a read request for the data object A. The computing device can generate metadata that includes an indicator to prefetch data object B when the read request for the data object A is received. The computing device can store the data object A with the metadata on the hard disk. Thereafter, the computing device can receive the read request for the data object A, obtain the data object A from the hard disk, and store the data object A in a cache memory. The computing device can also access the metadata for data object A, which indicates that the data object B is to be prefetched. So, the computing device can obtain the data object B from the hard disk and store the data object B in the cache memory. This may aid in reducing latency when the computing device receives a subsequent read request for the data object B.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing data prefetching according to some aspects of the present disclosure. The system 100 can include a client device 104. Examples of the client device 104 can include a laptop computer, desktop computer, server, mobile phone, etc. The system can additionally include a server 110, a cache memory 130, and a storage device 120. Examples of the storage device 120 can include a hard disk drive or a solid-state drive. As shown in FIG. 1, some or all of these components can communicate with one another via a network 140, such as a local area network (LAN) or the Internet. Alternatively, some of these components may be internal to the server 110. For instance, the server 110 can include the storage device 120, the cache memory 130, or both. Regardless of their physical arrangement, the cache memory 130 and the storage device 120 can be collectively used to implement a LSM tree for storing data objects as key-value pairs in some examples.

A software application 106 can run on the client device 104. The server 110 can receive read and write requests from the software application 106. For example, the server 110 can receive a write request 114 for writing a first data object 122 to the storage device 120. In response to the write request 114, the server 110 can determine that a second data object 124 is to be prefetched when a read request 112 for the first data object 122 is received from the software application 106.

In some examples, the server 110 can use a historical pattern of read requests to determine that the second data object 124 to be prefetched. For example, the server 110 can analyze stored information indicating a historical pattern of read requests from the software application 106. Based on this analysis, the server 110 can determine that the software application 106 has historically followed a read request 112 for the first data object 122 with another read request for the second data object 124 multiple times in the past. The server 110 may analyze the stored information using a machine-learning model (e.g., a deep neural network) or using any other suitable technique to identify this historical pattern. Based on this historical pattern, the server 110 can determine that the second data object 124 is to be prefetched based on the read request 112 for the first data object 122 being received from the software application 106. If a machine-learning model is used to determine the relationship between the second data object and the first data object, in some examples the machine-learning model may also determine a confidence value indicating a confidence of the machine-learning model in its determined relationship between the second data object and the first data object. For example, the machine-learning model can determine a confidence value of 0.8, indicating that the machine-learning model is 80% confident in its determination.

After determining that the second data object 124 is to be prefetched, the server 110 generates metadata 126 for the first data object 122. The metadata 126 can indicate which data object is to be prefetched, where the prefetching is to occur based on the read request 112 for the first data object 122 from the software application 106. For example, the metadata 126 can indicate that the second data object 124 is to be prefetched. The server 110 can also include the confidence value output by the machine-learning model in the metadata 126, in some examples. The server 110 can then store the first data object 122 with the metadata 126 in the storage device 120.

In some examples, after the server 110 makes an initial determination of the data object to be prefetched, but prior to storing the metadata 126 in the storage device 120, the server 110 may receive additional read requests for the first data object 122 from the software application 106. Based on the additional read requests, the server 110 may change the data object to be prefetched and update the metadata 126 accordingly. For example, the metadata 126 can be updated based on one or more of the additional read requests to indicate that another data object is to be prefetched by the server 110. In this way, the metadata 126 may be updated one or more times before the metadata 126 is stored in the storage device 120.

In some examples, the server 110 can receive the read request 112 for the first data object 122. In response, the server 110 can obtain the first data object 122 from the storage device 120, store the first data object 122 in the cache memory 130, and provide the first data object 122 back to the client device 104 in reply to the read request 112. The server 110 can additionally access the metadata 126 and determine the second data object 124 is to be prefetched. As a result, the server 110 can obtain the second data object 124 from the storage device 120 and store the second data object 124 in the cache memory 130 for subsequent use in relation to a subsequent read request for the second data object 124.

When the server 110 receives a write request for a data object that is already stored on the storage device 120, the server 110 can generate new metadata for the data object (e.g., rather than replacing the existing metadata for the data object) given how a LSM tree operates. That new metadata can then be written to the storage device 120. As a result, the storage device 120 can store multiple versions of metadata associated with the same data object at a given point in time. For example, the storage device 120 can store multiple versions of the metadata associated with the first data object 122. Each version of the metadata can indicate a particular data object to be prefetched in response to a read request 112 for the first data object 122. But the prefetch data object specified in one version of the metadata may be different than a prefetch data object specified in another version of the metadata. For example, one version of the metadata may indicate that the second data object 124 is to be prefetched, while another version of the metadata may indicate that a third data object is to be prefetched. The server 110 can include a read policy 116 to determine which data object to prefetch in response to the read request 112 for the first data object 122.

In some examples, the read policy 116 can involve selecting a data object that is most frequently referenced in the multiple versions of the metadata. For example, two versions of the metadata can indicate the second data object 124 is to be prefetched in response to the read request 112 for the first data object 122, and one version of the metadata can indicate a third data object is to be prefetched in response to the read request 112 for the first data object 122. Based on more versions of the metadata indicating that the second data object 124 is to be prefetched than the third data object, the system 100 can select the second data object 124 to be prefetched. Prefetching the second data object 124 can involve obtaining the second data object 124 from the storage device 120 and storing the second data object 124 in the cache memory 130 for subsequent use in relation to a subsequent read request for the second data object 124.

Alternatively, the read policy 116 may involve selecting whichever data object was most recently requested by the software application 106 from among some or all of the data objects specified in the multiple versions of the metadata. For example, the server 110 can determine the second data object 124 was most recently requested by the software application 106 among some or all of the data objects specified in the multiple versions of the metadata. So, the server 110 can select the second data object 124 to be prefetched.

In other examples, the read policy 116 can involve selecting whichever data object is associated with a highest confidence value from among some or all of the data objects specified in the multiple versions of the metadata. For example, the server 110 can determine that a first version of the metadata indicates the second data object 124 is to be prefeteched with a confidence value of 0.8. The server 110 can also determine that a second version of the metadata indicates a third data object is to be prefeteched with a confidence value of 0.5. The server 110 can select the second data object 124 to be prefetched based on determining that the confidence value associated with the second data object 124 is higher than the confidence value associated with the third data object. The server 110 can then prefetch the second data object 124.

In some examples, the read policy 116 can include a weighted algorithm for determining which data object to prefetch in response to the read request 112 for the first data object 122. In one example, the weighted algorithm may be configured for selecting a data object with a highest weighted average, among some or all of the data objects specified in the multiple versions of the metadata, to be prefetched. The server 110 can weigh data objects based on confidence values, access times (e.g., most recent can have a higher weight), access frequencies, any other suitable criteria, or any combination of suitable criteria. As one particular example, the weighted average can be based on a combination of the time of access and the frequency of access. The server 110 can assign a first weight for the time of access and a second weight for the frequency of access for each data object. The server 110 can determine the second data object 124 has a higher weighted average for the time of access and the frequency of access than the third data object. The server 110 can select the second data object 124 to be prefetched based on determining the second data object 124 has a higher weighted average than the third data object. The server 110 can then prefetch the second data object 124.

In some examples, the server 110 can execute a compaction process to merge the multiple versions of the metadata into a single version of the metadata on the storage device 120 based on a merge policy 118. The merge policy 118 can use one or more of the techniques described above with respect to the read policy 116 (or other techniques) to determine which data object indicated in the multiple versions of the metadata to use in the single version of the metadata.

For example, the merge policy 118 can involve selecting whichever data object is most frequently referenced in the multiple versions of the metadata. For example, two versions of the metadata can indicate the second data object 124 is to be prefetched in response to the read request 112 for the first data object 122 and one version of the metadata can indicate a third data object is to be prefetched in response to the read request 112 for the first data object 122. Based on more versions of the metadata indicating that the second data object 124 is to be prefetched than the third data object, the server 110 can select the second data object 124. The server 110 can generate the single version of the metadata to indicate that only the second data object 124 is to be prefetched.

Alternatively, the merge policy 118 may involve selecting whichever data object was most recently requested by the software application 106 from among some or all of the data objects specified in the multiple versions of the metadata. For example, the server 110 can determine the second data object 124 was most recently requested by the software application 106 from among some or all of the data objects specified in the multiple versions of the metadata. So, the server 110 can select the second data object 124. The server 110 can generate the single version of the metadata to indicate that only the second data object 124 is to be prefetched.

In other examples, the merge policy 118 can involve selecting a data object with a highest confidence value from among some or all of the data objects indicated in the multiple versions of the metadata. For example, the server 110 can determine that a first version of the metadata indicates the second data object 124 is to be prefetched with a confidence value of 0.8. The server 110 can also determine that a second version of the metadata indicates a third data object is to be prefeteched with a confidence value of 0.5. The server 110 can select the second data object 124 based on determining the second data object 124 has the highest confidence value. The server 110 can generate the single version of the metadata to indicate that only the second data object 124 is to be prefetched. The confidence value for the data object in the single version of the metadata can be different from the highest confidence value, in some examples. For example, the confidence value used in the single version of the metadata may be an average of all of the confidence values in the multiple versions of the metadata or otherwise based on two or more of the confidence values in the multiple versions of the metadata. For example, the confidence value in the single version of the metadata can be 0.7, as determined based on the confidence value in the first version of the metadata being 0.8 for prefetching the second data object 124 and the confidence value being 0.5 for prefetching the third data object in the second version of the metadata.

In some examples, the merge policy 118 can involve selecting a data object associated with a current prediction. For example, if metadata for the first data object 126 has not been previously generated and stored on the storage device 120, the server 110 can determine the current prediction for the data object to be prefetched based on the read request 112 for the first data object 126. During the compaction process, the server 110 can generate a single version of metadata based on the current prediction, and store the single version of metadata in the storage device 120.

While the example shown in FIG. 1 depicts a specific number and arrangement of components for simplicity, other examples may include more components, fewer components, different components, or a different arrangement of the components shown in FIG. 1. For instance, the principles described herein can be implemented locally on a computing device based on read and write requests from software executing locally on the computing device (e.g., rather than based on read and write requests from an external client device 104).

Figure 2:
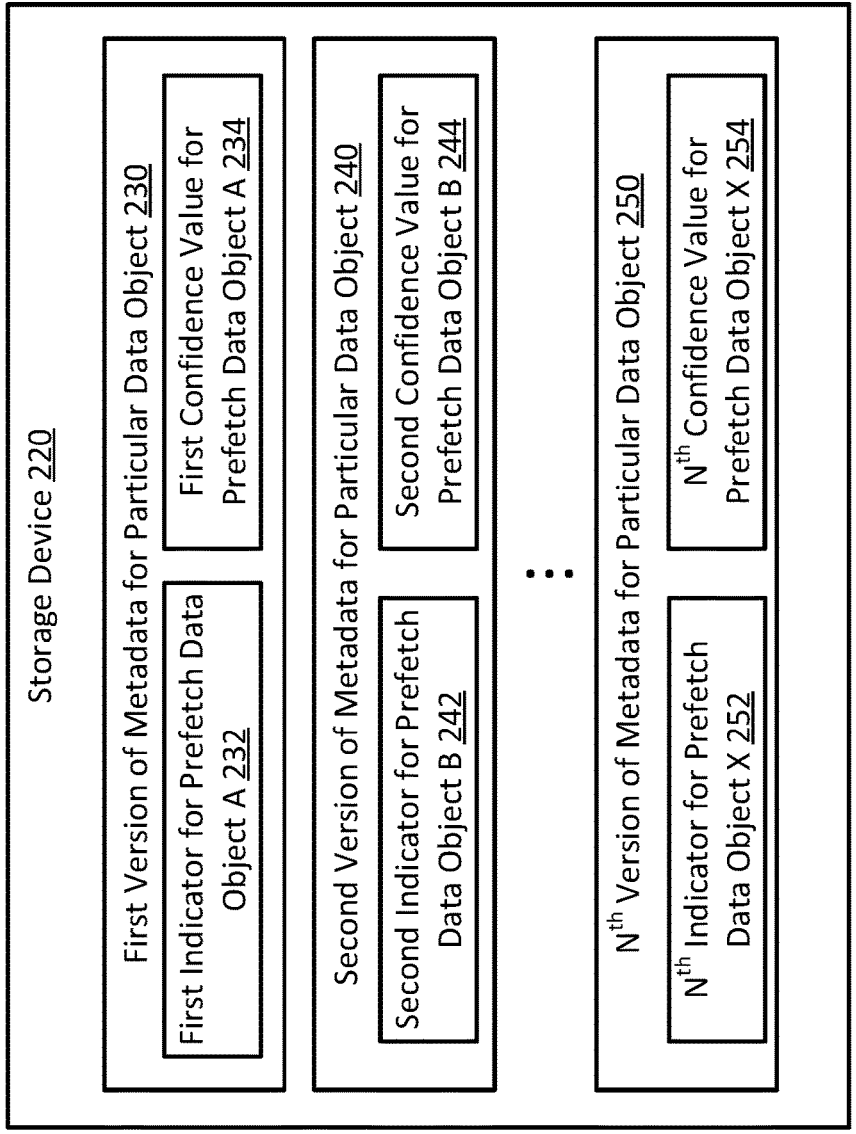
FIG. 2 is a diagram of a storage device storing metadata in a log-structured merge tree system according to some aspects of the present disclosure.

FIG. 2 is a block diagram of a storage device 220 storing metadata in a log-structured merge tree system according to some aspects of the present disclosure. The storage device 220 can store multiple versions of metadata associated with a data object. For example, the storage device 220 includes N versions of metadata for a particular data object. The $N^{th}$ version of the metadata for a data object can correspond to a least recent (e.g., oldest) version of the metadata.

The multiple versions of the metadata can indicate multiple data objects to be prefetched based on a read request for the particular data object. For example, a first version of metadata for the particular data object 230 can include a first indicator for prefetch data object A 232. A second version of metadata for the particular data object 240 can include a second indicator for prefetch data object B 242. And an $N^{th}$ version of metadata for the particular data object 250 can include an $N^{th}$ indicator for prefetch data object X 252.

In some examples, the multiple versions of metadata also include a confidence value for prefetching the indicated data object. The confidence value can be determined by a machine-learning model. For example, the first version of metadata for the particular data object 230 includes a first confidence value for prefetch data object A 234. The second version of metadata for the particular data object 240 includes a second confidence value for prefetch data object B 244. And the $N^{th}$ version of metadata for the particular data object 250 includes a $N^{th}$ confidence value for prefetch data object X 254.

In some examples, a read policy may be used to determine which data object to prefetch in response to a read request for the particular data object. The read policy can involve selecting a data object that is most frequently referenced in the N versions of the metadata for the particular data object, selecting a data object that was most recently requested, selecting a data object with a highest confidence value in the N versions of the metadata for the particular data object, or any other suitable policy for determining a data object to prefetch.

Additionally, a merge policy may be used during a compaction process to determine which metadata to maintain in a single version of the metadata. The merge policy can involve selecting a data object that is most frequently referenced in some or all of the N versions of the metadata, selecting a data object that was most recently requested, selecting a data object with a highest confidence value in some or all of the N versions of the metadata, or any other suitable policy for determining metadata to include in the single version of the metadata.

Figure 3:
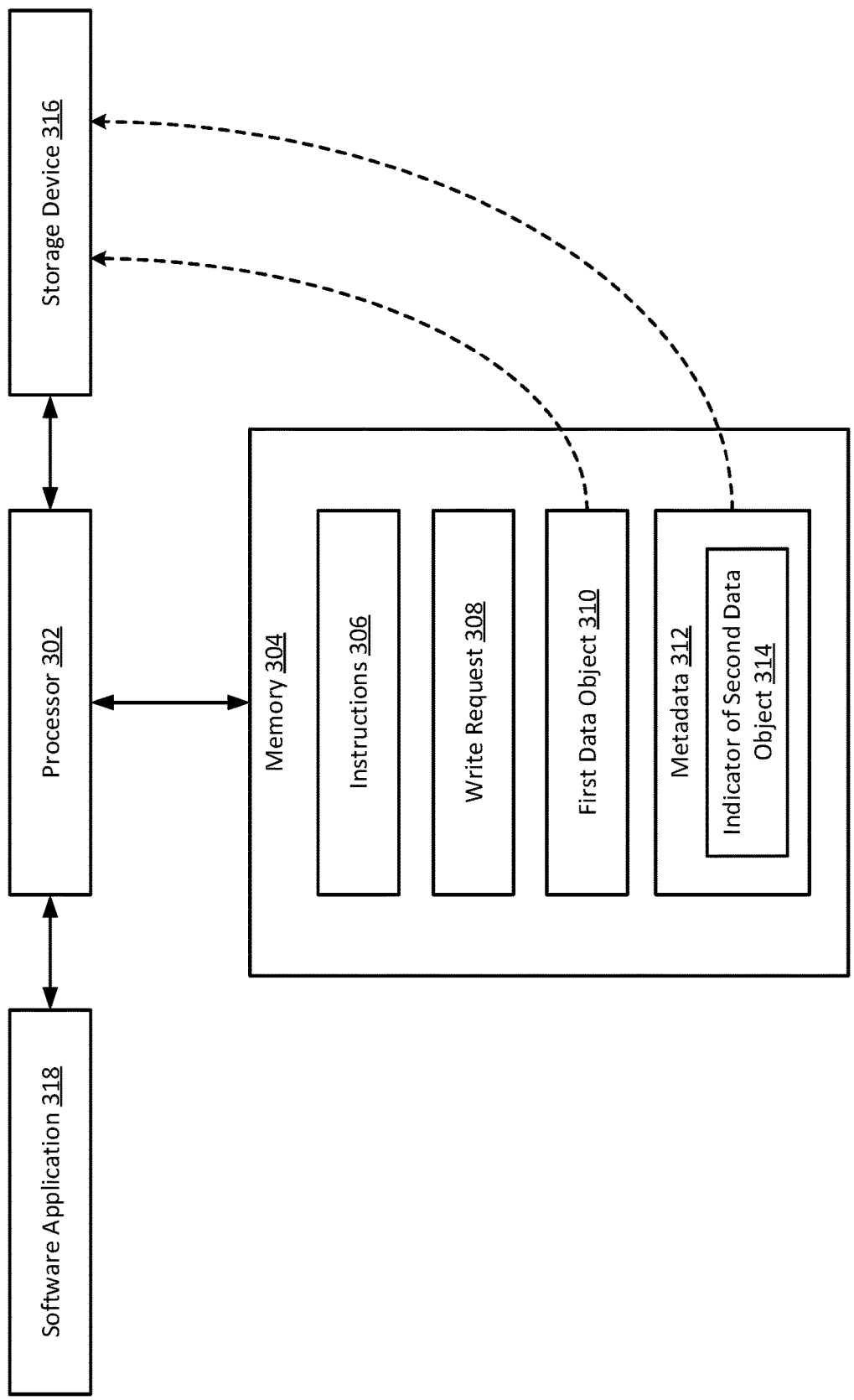
FIG. 3 is a block diagram of another example of a system for implementing data prefetching according to some aspects of the present disclosure.

FIG. 3 is a block diagram of another example of a system 300 for implementing data prefetching according to some aspects of the present disclosure. The system 300 includes a processor 302 communicatively coupled with a memory 304. In some examples, the processor 302 and the memory 304 can be part of the same computing device, such as the server 110 of FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute instructions 306 to perform various operations. For example, the processor 302 can receive a write request 308 from a software application 318. The write request 308 can be a write request for writing a first data object 310 to a storage device 316. The processor 302 can then determine a second data object that is to be prefetched (e.g., based on a read request for the first data object 310 from the software application 318). The processor 302 can generate metadata 312 for the first data object 310 that includes an indicator of the second data object 314 that is to be prefetched. The processor 302 can store the first data object 310 with the metadata 312 in the storage device 316.

In some examples, the processor 302 can obtain the first data object 310 from the storage device 316 in response to receiving the read request for the first data object 310. The processor 302 can store the first data object 310 in a cache memory. The processor 302 can also access the metadata 312 for the first data object 310 and determine from the metadata 312 that the second data object is to be prefeteched. In circumstances where the storage device 316 includes multiple versions of metadata for the first data object 310, the processor 302 can use a predefined read policy to determine that the second data object is to be prefetched. The processor 302 can then obtain the second data object from the storage device 316 and store the second data object in the cache memory. This can allow the second data object to be rapidly retrieved from the cache memory for responding to a subsequent read request for the second data object.

Figure 4:
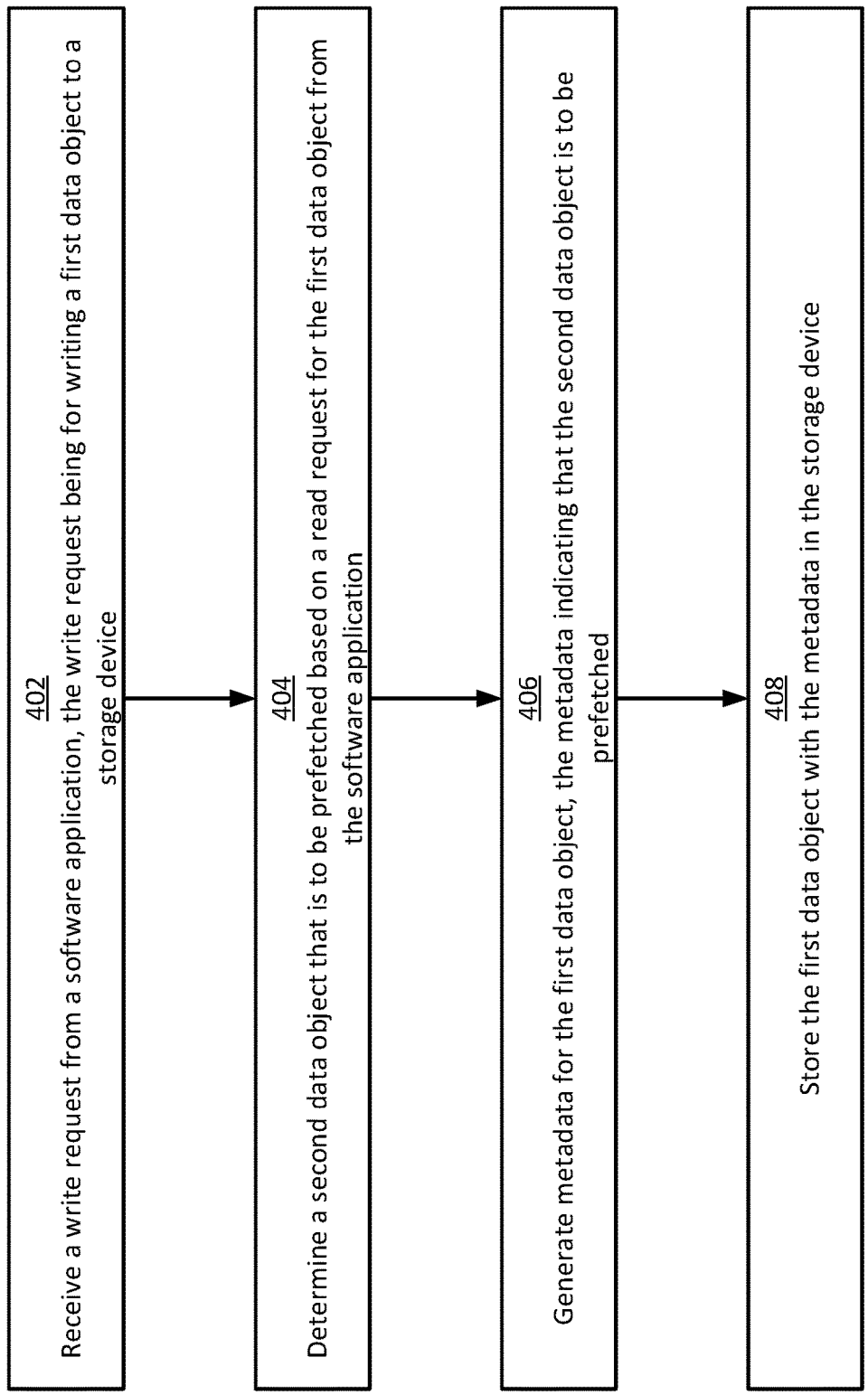
FIG. 4 is a flow chart of an example of a process for prefetching data according to some aspects of the present disclosure.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 receives a write request 308 from a software application 318. The write request 308 can be for writing a first data object 310 to a storage device 316.

In block 404, the processor 302 determines a second data object that is to be prefetched based on a read request from the software application 318 for the first data object 310. The processor 302 can execute a machine-learning model to determine that the second data object is to be prefetched.

In block 406, the processor 302 generates metadata 312 for the first data object 310. The metadata 312 can include an indicator of the second data object 314 to be prefetched. Additionally, the metadata 312 can include a confidence value associated with prefetching the second data object. The confidence value can be determined by the machine-learning model.

In block 408, the processor 302 stores the first data object 310 with the metadata 312 in the storage device 316. When the processor 302 receives a read request for the first data object 310, the processor 302 can obtain the first data object 310 from the storage device 316 and store the first data object 310 in a cache memory. The processor 302 can access the metadata 312 for the first data object 310 to determine the second data object is to be prefetched. The processor 302 can then prefetch the second data object by obtaining the second data object from the storage device 316 and storing the second data object in the cache memory.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory including instructions that are executable by the processor for causing the processor to:
   receive a plurality of write requests from one or more software applications, the plurality of write requests being for writing a first data object to a storage device;
   in response to receiving each respective write request in the plurality of write requests, generate a respective version of metadata for the first data object by:
   selecting a respective data object from among a set of data objects that are stored on the storage device;
   generating the respective version of the metadata for the first data object, wherein the respective version of the metadata includes a unique identifier of the respective data object; and
   storing the respective version of the metadata, wherein generating each respective version of the metadata in response to each respective write request in the plurality of write requests produces a plurality of versions of metadata corresponding to the first data object; and
   subsequent to generating the plurality of versions of the metadata:
   receive a read request for the first data object;
   in response to receiving the read request for the first data object, select a second data object that is to be prefetched by applying a predefined read policy to the respective data objects identified in the plurality of versions of metadata; and
   fetch the second data object from the storage device and store the second data object in a cache memory for subsequent use in relation to a read request for the second data object.

2. The system of claim 1, wherein the memory further includes instructions that are executable by the processor for causing the processor to, in response to receiving the read request for the first data object:
   obtain the first data object from the storage device and store the first data object in the cache memory.

3. The system of claim 1, wherein the predefined read policy involves selecting a data object that is most frequently referenced in the plurality of versions of the metadata, and wherein the second data object is selected based on the second data object being most frequently referenced in the plurality of versions of the metadata.

4. The system of claim 1, wherein the predefined read policy involves selecting a data object, from among a plurality of data objects specified in the plurality of versions of the metadata, that was most recently requested by a software application, and wherein the second data object is selected based on the second data object being most recently requested among the plurality of data objects by the software application.

5. The system of claim 1, wherein the memory further includes instructions that are executable by the processor for causing the processor to execute a compaction process for merging the plurality of versions of the metadata into a single version of the metadata on the storage device based on a predefined merge policy.

6. The system of claim 5, wherein the predefined merge policy involves selecting a data object that is most frequently referenced in the plurality of versions of the metadata, and wherein the memory further includes instructions that are executable by the processor for causing the processor to:
   select the second data object based on the second data object being most frequently referenced in the plurality of versions of the metadata; and
   based on selecting the second data object, generate the single version of the metadata indicating that only the second data object is to be prefetched.

7. The system of claim 5, wherein the predefined merge policy involves selecting a data object, from among a plurality of data objects specified in the plurality of versions of the metadata, that was most recently requested by a software application, and wherein the memory further includes instructions that are executable by the processor for causing the processor to:
   select the second data object based on the second data object being most recently requested among the plurality of data objects by the software application; and
   based on selecting the second data object, generate the single version of the metadata to indicate that only the second data object is to be prefetched among the plurality of data objects.

8. The system of claim 5, wherein the memory further includes instructions that are executable by the processor for causing the processor to generate the plurality of versions of the metadata by:
   executing a machine-learning model to determine a plurality of data objects and a plurality of confidence values corresponding to the plurality of data objects, each confidence value in the plurality of confidence values indicating a confidence of the machine-learning model in determining that a corresponding data object in the plurality of data objects is to be prefetched; and
   include the plurality of confidence values in the plurality of versions of the metadata, each version of the metadata in the plurality of versions of the metadata indicating (i) the respective data object among the plurality of data objects to be prefetched and (ii) a respective confidence value corresponding to the respective data object from among the plurality of confidence values.

9. The system of claim 8, wherein the predefined merge policy involves selecting a data object among the plurality of data objects with a highest confidence value among the plurality of confidence values, and wherein the memory further includes instructions that are executable by the processor for causing the processor to:
   select the second data object based on the second data object having the highest confidence value among the plurality of confidence values; and
   based on selecting the second data object, generate the single version of the metadata to indicate that only the second data object is to be prefetched among the plurality of data objects.

10. A method comprising:
    receiving, by a processor of a computer system, a plurality of write requests from one or more software applications, the plurality of write requests being for writing a first data object to a storage device;
    in response to receiving each respective write request in the plurality of write requests, generating a respective version of metadata for the first data object by:
    selecting, by the processor, a respective data object from among a set of data objects that are stored on the storage device;
    generating, by the processor, the respective version of the metadata for the first data object, wherein the respective version of the metadata includes a unique identifier of the respective data object; and storing, by the processor, the respective version of the metadata, wherein generating each respective version of the metadata in response to each respective write request in the plurality of write requests produces a plurality of versions of metadata corresponding to the first data object; and subsequent to storing the plurality of versions of the metadata in the storage device:

receiving, by the processor, a read request for the first data object;

in response to receiving the read request for the first data object, selecting, by the processor, a second data object that is to be prefetched by applying a predefined read policy to the respective data objects identified in the plurality of versions of metadata; and fetching, by the processor, the second data object from the storage device and storing the second data object in a cache memory for subsequent use in relation to a read request for the second data object.

11. The method of claim 10, further comprising, in response to receiving the read request for the first data object:

obtaining the first data object from the storage device and storing the first data object in the cache memory.

12. The method of claim 10, wherein the predefined read policy involves selecting a data object that is most frequently referenced in the plurality of versions of the metadata, and wherein the second data object is selected based on the second data object being most frequently referenced in the plurality of versions of the metadata.

13. The method of claim 10, wherein the predefined read policy involves selecting a data object, from among a plurality of data objects specified in the plurality of versions of the metadata, that was most recently requested by a software application, and wherein the second data object is selected based on the second data object being most recently requested among the plurality of data objects by the software application.

14. The method of claim 11, further comprising executing a compaction process for merging the plurality of versions of the metadata into a single version of the metadata on the storage device based on a predefined merge policy.

15. The method of claim 14, wherein the predefined merge policy involves selecting a data object that is most frequently referenced in the plurality of versions of the metadata, and wherein the method further comprises:

selecting the second data object based on the second data object being most frequently referenced in the plurality of versions of the metadata; and based on selecting the second data object, generating the single version of the metadata indicating that only the second data object is to be prefetched.

16. The method of claim 14, wherein the predefined merge policy involves selecting a data object, from among a plurality of data objects specified in the plurality of versions of the metadata, that was most recently requested by a software application, and wherein the method further comprises:

selecting the second data object based on the second data object being most recently requested among the plurality of data objects by the software application; and based on selecting the second data object, generating the single version of the metadata to indicate that only the second data object is to be prefetched among the plurality of data objects.

17. The method of claim 14, wherein the method further comprises generating the plurality of versions of the metadata by:

executing a machine-learning model to determine a plurality of data objects and a plurality of confidence values corresponding to the plurality of data objects, each confidence value in the plurality of confidence values indicating a confidence of the machine-learning model in determining that a corresponding data object in the plurality of data objects is to be prefetched; and including the plurality of confidence values in the plurality of versions of the metadata, each version of the metadata in the plurality of versions of the metadata indicating (i) the respective data object among the plurality of data objects to be prefetched and (ii) a respective confidence value corresponding to the respective data object from among the plurality of confidence values.

18. A non-transitory computer-readable medium comprising program code that is executable by a processor of a computer system for causing the computer system to:

receive a plurality of write requests from one or more software applications, the plurality of write requests being for writing a first data object to a storage device;

in response to receiving each respective write request in the plurality of write requests, generate a respective version of metadata for the first data object by:

selecting a respective data object from among a set of data objects that are stored on the storage device;

generating the respective version of the metadata for the first data object, wherein the respective version of the metadata includes a unique identifier of the respective data object; and storing the respective version of the metadata, wherein generating each respective version of the metadata in response to each respective write request in the plurality of write requests produces a plurality of versions of metadata corresponding to the first data object; and subsequent to generating the plurality of versions of the metadata:

receive a read request for the first data object;

in response to receiving the read request for the first data object, select a second data object that is to be prefetched by applying a predefined read policy to the respective data objects identified in the plurality of versions of metadata; and fetch the second data object from the storage device and store the second data object in a cache memory for subsequent use in relation to a read request for the second data object.

19. The system of claim 1, wherein the storage device is part of a log-structured merge (LSM) tree system.

20. The method of claim 10, wherein the storage device is part of a log-structured merge (LSM) tree system.

* * * * *